(12) United States Patent
Sakai et al.

(10) Patent No.: US 6,184,995 B1
(45) Date of Patent: Feb. 6, 2001

(54) PRINTER APPARATUS, CONTROL METHOD THEREOF, AND PRINTER SYSTEM

(75) Inventors: Hideki Sakai; Junichi Mori, both of Kawasaki; Takashi Okazawa, Yokohama; Yasuko Shibahara, Inagi, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/676,688

(22) Filed: Jul. 10, 1996

(51) Int. Cl.[7] .................................................. G06F 15/00
(52) U.S. Cl. ..................... 358/1.15; 358/1.13; 358/1.14; 710/25; 710/58; 710/59
(58) Field of Search ..................................... 395/112, 113, 395/114, 115, 200.52, 200.65, 200.62, 828; 358/442, 468, 1.13, 1.14, 1.15, 1.16; 710/25, 32, 46, 47, 58, 59

(56) References Cited

U.S. PATENT DOCUMENTS

| | | | |
|---|---|---|---|
| 4,930,087 | * 5/1990 | Egawa et al. ........................ | 364/518 |
| 5,579,447 | * 11/1996 | Salgado ............................... | 395/114 |
| 5,623,606 | * 4/1997 | Yokoyama et al. .................. | 395/250 |
| 5,647,056 | * 7/1997 | Barrett et al. ....................... | 395/115 |
| 5,706,281 | * 1/1998 | Hasimoto et al. ................... | 370/252 |
| 5,751,799 | * 5/1998 | Mori .................................... | 379/114 |
| 5,905,906 | * 5/1999 | Goffinet et al. ..................... | 395/114 |

* cited by examiner

Primary Examiner—Edward L. Coles
Assistant Examiner—Mark Wallerson
(74) Attorney, Agent, or Firm—Fitzpatrick, Cella, Harper & Scinto

(57) ABSTRACT

It is an object to provide a printer apparatus, a control method of such an apparatus, and a printer system, in which a proper control can be performed in consideration of a change in network load. When a load of a transmission path is measured and a data reception from a host is interrupted, a waiting time of the data is extended in accordance with the measured load, thereby realizing the object. The set operating conditions are transmitted to the host and are also automatically set into the other printers connected to the network to which the printer is connected via the host, thereby realizing the object.

74 Claims, 6 Drawing Sheets

PRINTER APPARATUS, CONTROL METHOD THEREOF, AND PRINTER SYSTEM

BACKGROUND OF THE INVENTION

1. Field of the Invention

The present invention relates to a printer apparatus, a control method thereof, and a printer system and, more particularly, to a printer apparatus through, for example, a network, a control method thereof, and a printer system.

2. Related Background Art

Hitherto, an output apparatus such as a printer or the like is connected to a host computer (hereinbelow, simply referred to as a host) or the like by an LAN such as Ethernet or the like, thereby constructing an information processing system. Not only one host but also a plurality of hosts, a plurality of printers, a plurality of scanners, and further, a facsimile apparatus, a communicating control apparatus, and the like for performing a data communication with an external apparatus are connected to the LAN, so that there is a case where an LAN system of a large scale which shares data transmission paths is constructed.

In such an LAN system, since information processing apparatuses constructing the system efficiently uses the data transmission paths, each of the constructing apparatuses always monitors a busy state of the data transmission path. When a certain constructing apparatus tries to communicate with another constructing apparatus or when the communication is impossible for a predetermined time or more because a load of the data transmission path is high during the communication, the LAN system controls so as to temporarily stop the communication (it is called a time-out process).

Further, a plurality of same kind (same performance, same format, and same operation environment can be set by the same procedure) of apparatuses can be also connected to such an LAN system. However, upon connection, it is necessary to perform an environment setting to operate in the LAN system to each of the apparatuses.

However, in the conventional apparatus, since a plurality of hosts and peripheral equipment are connected, a large amount of data flows into the data transmission path in a lump. When the load of the data transmission path rises and the communication is temporarily interrupted, the user cannot judge whether the interruption of the communication was caused due to a failure of an apparatus on the communication partner of such a communication or by a reason such that the own apparatus finished a session or by a delay of the communication due to a mere increase in the load of the data transmission path. There is, consequently, a problem such that the time-out process is unconditionally performed when a predetermined time elapses after the time point of the interruption of the communication.

For example, when the transmission of data is interrupted while the printer is receiving the data from the host, the user cannot judge whether the interruption occurs because the host of the data transmitting source interrupted the data transmission or a delay of the transmission of data occurs due to an increase in load of the data transmission path. Thus, the user performs the time-out process without intending.

When a plurality of same kind of printers are connected to the LAN system, since the environment setting has to be similarly repetitively performed many times, the setting operation is very troublesome. On the other hand, as for specific information (for example, apparatus identifier), the peculiar environment setting has to be performed to each printer, so that the user of the apparatus is required to carefully perform the setting. Therefore, there is a problem such that in spite of a fact that such an environment setting operation is troublesome and needs a scrupulous care, the setting is likely to fail.

SUMMARY OF THE INVENTION

The invention is made in consideration of the above conventional apparatus and it is an object to provide a printer apparatus, a control method thereof, and a printer system in which the environment setting can be easily performed and which can perform a proper process on the basis of an operation environment.

To accomplish the above object, according to the invention, there is provided a printer apparatus which is connected through a network, comprising: measuring means for measuring a use load of the network; and setting means for setting a waiting time of data from a host in accordance with the use load measured by the measuring means.

The printer apparatus of the invention further comprises: judging means for judging whether the apparatus has been connected to the network or not; and setting means for setting a waiting time of data on the basis of the judgment by the judging means.

According to the invention, there is provided a control method of the printer apparatus which is connected through a network, comprising: a measuring step of measuring a use load of the network; and a setting step of setting a waiting time of data from a host in accordance with the use load measured by the measuring step.

The control method of the printer apparatus according to the invention further comprises: a judging step of judging whether the apparatus has been connected to the network or not; a setting step of setting a waiting time of data on the basis of the judgment by the judging step.

According to the invention, there is provided a printer system in which a plurality of printer apparatuses and a host to transmit print data to the plurality of printer apparatuses are connected through a network, wherein the host has: receiving means for receiving operating conditions set in a first printer apparatus from the first printer apparatus among the plurality of printer apparatuses; and transmitting means for transmitting the operating conditions received by the receiving means to the other printer apparatuses excluding the first printer apparatus.

The above and other objects and features of the present invention will become apparent from the following detailed description and the appended claims with reference to the accompanying drawings.

DETAILED DESCRIPTION OF THE PREFERRED EMBODIMENTS

A preferred embodiment of the invention will now be described in detail hereinbelow with reference to the drawings.

Figure 1:
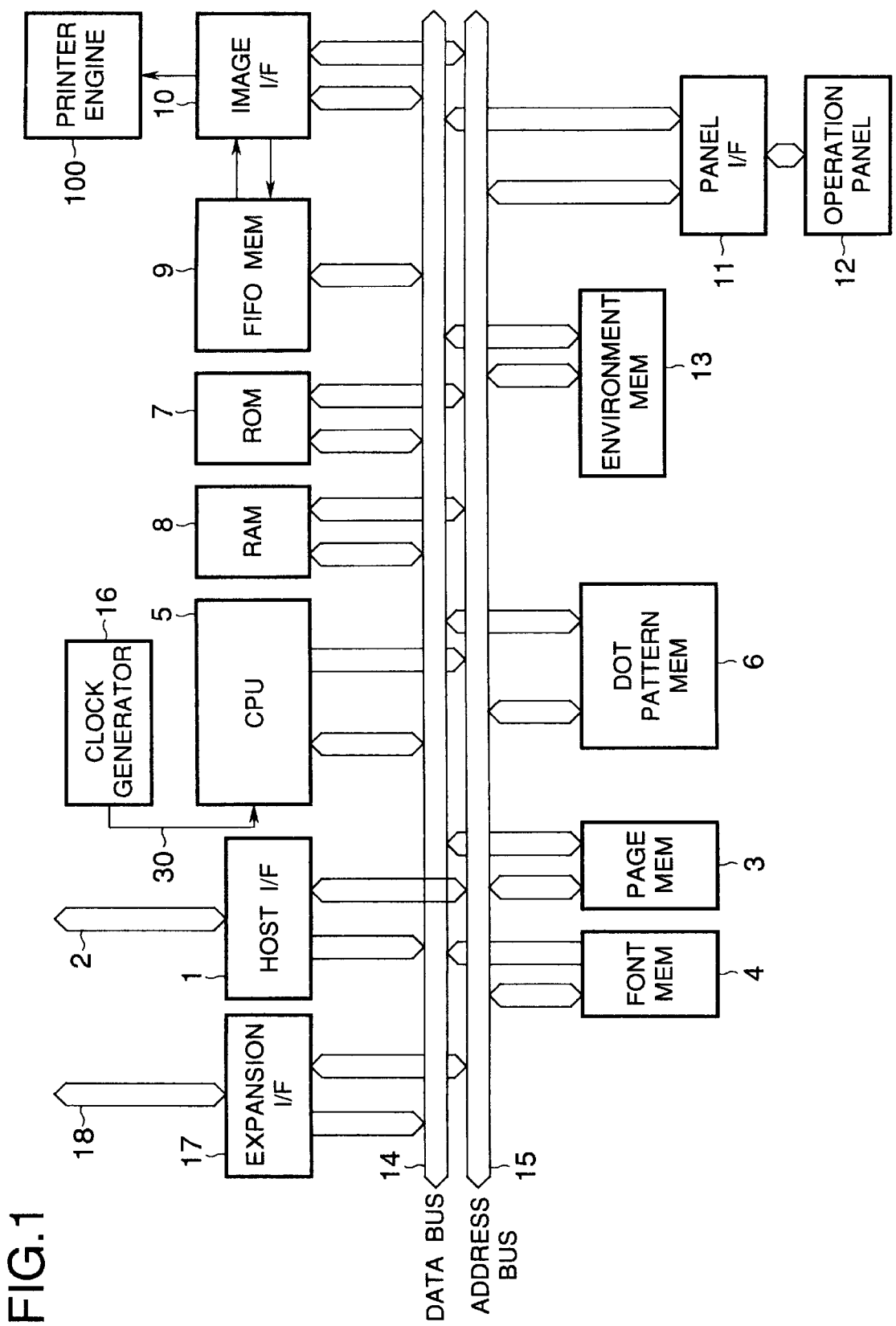
FIG. 1 is a block diagram showing a construction of a printer apparatus as a typical embodiment.

FIG. 1 is a block diagram showing a construction of a printer apparatus as a typical embodiment of the invention. As a printer engine 100 of the apparatus shown in FIG. 1, an apparatus for forming an image in accordance with an electrophotographic system (laser beam printer), an apparatus for forming an image in accordance with an ink jet system (ink jet printer), or an apparatus for forming an image in accordance with the other system can be also used.

A plurality of printer apparatus are connected to an LAN and receive image data from a host computer (hereinbelow, referred to as a host) through the LAN and can output an image.

In FIG. 1, reference numeral 1 denotes a host interface (I/F) for communicating with a host which is not connected to the network; 2 a transmission path to which communication data with the host is transferred; 3 a page memory having a capacity to store character data of a code data format, figure forming information, and image data, of at least one page of a recording paper received from the host through the host I/F 1, and other control information; 4 a font memory in which character pattern data has been stored in correspondence to the character code data; 5 a CPU for controlling the whole apparatus; and 6 a dot pattern memory for storing a dot pattern of at least one page of a recording paper developed on the basis of the character code data, figure forming information, or the image data stored in the page memory 3.

Reference numeral 7 denotes an ROM for storing a control program (including a program according to a flowchart, which will be described hereinlater) to control the whole apparatus and 8 indicates an RAM. When the CPU 5 reads out the control program stored in the ROM 7 and executes the control process of the whole apparatus, the RAM 8 is used as a temporary work area to/from which various data is inputted or outputted and which is used in order to execute such a control process. Reference numeral 9 denotes an FIFO memory in which the dot pattern data is inputted from the dot pattern memory 6 and is temporarily stored and is outputted in accordance with an FIFO (First In First Out) system; and 10 an image forming unit interface (I/F) for receiving the image data (dot pattern data) from the FIFO memory 9 and outputting to the printer engine 100. The printer engine 100 performs a print output on the basis of the outputted image data.

Further, reference numeral 11 denotes an operation panel having a keyboard for performing an input to set various operating conditions such as setting of on-line/off-line states of the host interface 1 and an expansion interface (I/F) 17 and the like by the user of the apparatus, an LCD, an LED, and the like; 12 an operation panel interface (I/F) for outputting signals generated on the basis of various instructions inputted from the operation panel 11 to the CPU 5; 13 a memory (environment memory) for preserving various operation environment set values of the apparatus which can be set from the operation panel 11 or host through the host I/F 1 and expansion I/F 17; 16 a clock generator for supplying a clock signal (CLK) to the CPU 5; 14 and 15 a data bus and an address bus each for connecting the components of the above mentioned apparatus; 17 the expansion I/F to which a network corresponding board is attached; and 18 a transmission path to which communication data to/from the network is transferred.

As will be obviously understood from the above construction, the various operating conditions of the apparatus can be set by not only the operation panel 11 but also the host through the host I/F 1 and expansion I/F 17.

In the apparatus with the construction as mentioned above, the CPU 5 controls so that the data received through the host I/F 1 and expansion I/F 17 is stored into the page memory 3, also executes a processing program such as an interpreter or the like stored in the ROM 7, analyzes a reception character code stored in the page memory 3, accesses to the font memory 4, and reads out the corresponding font pattern. Or the CPU analyzes the received figure forming information and allows dot patterns to be generated, thereby developing such patterns into the dot pattern memory 6.

An environment setting of the apparatus in an environment in which a plurality of apparatuses with the above-mentioned construction are connected to the host via the LAN will now be described hereinbelow.

Figure 2:
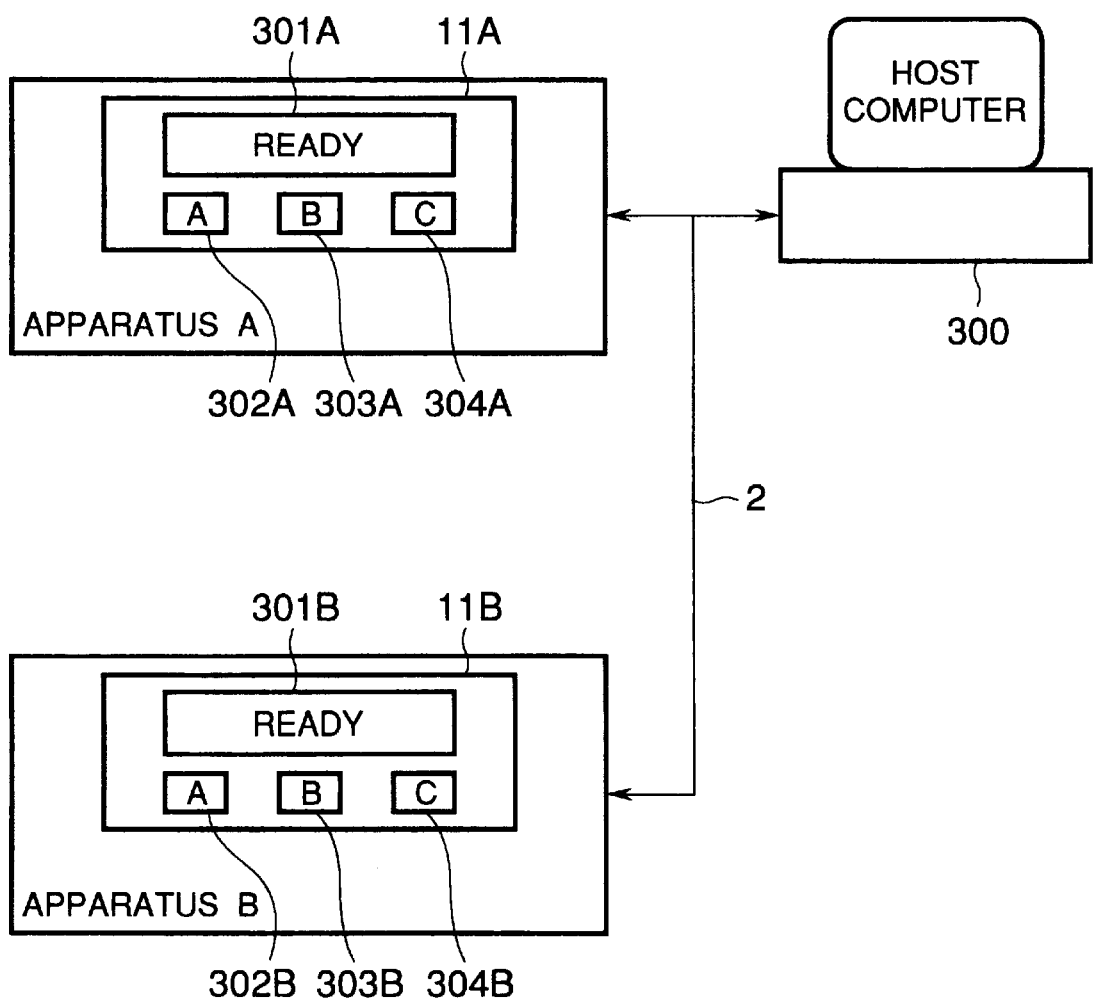
FIG. 2 is a diagram showing a network environment in which two printer apparatuses having the construction shown in FIG. 1 are connected to a host through an LAN.

FIG. 2 is a diagram showing a network environment in which two printer apparatuses (it is assumed that one apparatus is an apparatus A and the other is an apparatus B) each having the construction shown in FIG. 1 are connected to the host through the LAN.

In FIG. 2, reference numeral 300 denotes a host; 11A an operation panel of the apparatus A; 11B an operation panel of the apparatus B; 301A an LCD of the operation panel 11A; 301B an LCD of the operation panel 11B; 302A and 302B switches "A" of the push type of the apparatuses A and B, respectively; 303A and 303B switches "B" of the push type of the apparatuses A and B, respectively; and 304A and 304B switches "C" of the push type of the apparatuses A and B, respectively. In the apparatuses A and B, the switches "A", the switches "B", and the switches "C" have the same function, respectively.

The operation when the switch 302A is depressed will now be described.

When the switch 302A is depressed, predetermined information is transmitted from the apparatus A to the host 300 through the transmission path 2 in response to the depression. On the other hand, the host 300 executes the program which the host always has and transmits the information received from the apparatus A as command data to the apparatus B through the transmission path 2. The apparatus B analyzes the command and sets the operating conditions of the apparatus B into the same state as that when the switch 302B provided on the apparatus B is depressed.

As already described, the apparatus communicates with the host and receives data through the LAN for communicating in accordance with a predetermined communication protocol. However, when the data reception from the host is interrupted without executing the communication end procedure determined in the communication protocol or without receiving a predetermined printing process end command from the host, the following process is executed.

That is, after waiting for the data transmission from the host for a predetermined period of time on the basis of the values of various operating conditions which were temporarily set in the environment memory 13 or RAM 8, when there is no reception of subsequent data, the data reception waiting state is forcedly finished. A forced outputting process based on the data received so far is executed or a process of abandoning the received data or the like is executed, and the processing routine advances to an input waiting state of the next data (hereinafter, such a process is called a time-out process).

A print outputting process which is executed by using the apparatus with the above-mentioned construction while receiving data from the host through the LAN will now be described hereinbelow with reference to a flowchart shown in FIG. 3. In this instance, the processing program for executing the process shown in the flowchart of FIG. 3 has been stored in the ROM 7 of the apparatus shown in FIG. 1 and the CPU 5 executes the program.

First in step S201, a check is made to see whether the data has been received from the host through the host I/F 1. When it is judged that there is a data reception, step S203 follows. On the other hand, when it is judged that there is no data reception, step S202 follows and a load of the transmission path 2 is checked. After that, the processing routine is again returned to step S201.

A load measurement in step S202 is performed as follows in the embodiment.

Namely, a packet of a designated size (for example, 10 bytes) is transmitted plural times (for example, ten times) from the relevant printer to a specific host (not shown, referred to as a host X, hereinbelow) of the designated address on the network through the transmission path 2 in FIG. 1. The host X has been preset so as to return the received data to a printer apparatus of the transmitting source through the transmission path 2. A time (TR) which is required until all data is returned to the printer apparatus of the transmitting source after the data was transmitted from the printer apparatus to the host X plural times is measured, thereby measuring the load of the network. (Such measuring means is embodied by a "ping" command in the existing Unix OS.) The measured time (TR) is stored into the RAM 8 in FIG. 1.

Such a measurement time (TR) is used as an index to know the load state of the transmission path 2. When the time elapses and the load measuring process of the second or subsequent times in step S202 is executed, the measurement time obtained by the preceding load measurement is updated by the measurement time to be obtained at this time, thereby allowing an index notifying the latest load state of the transmission path 2 to be always stored in the RAM 8.

In step S203, a check is made to see if the data reception is continued. When it is judged that the data reception is continued, step S204 follows and a check is made to see whether the data reception has been finished or not. When data is still being received, the processing routine is returned to step S203. When the data reception is finished, step S208 follows and a series of outputting processes such as analysis of the reception data, development of the bit pattern, output of the bit pattern to the printer engine 100, and the like are performed. A confirmation of the end of the data reception in step S204 is executed by receiving a data transmission end notification from the host, detecting an EOF (End Of File) added to the last of the reception data, or the like.

On the other hand, when an interruption of the data reception is judged in step S203, step S205 follows and an elapsed time (T) after the start of the interruption of the data reception is monitored and a check is made to see if the elapsed time (T) has reached a predetermined time-out time (TO) or not. In this instance, when T<TO, the processing routine is returned to step S203.

On the contrary, when T≧TO, step S206 follows and a degree of the load of the transmission path 2 is discriminated. Such a judgment is performed as follows in the embodiment. Namely, with respect to the transmission path load of an ordinary LAN, a mean time (MTR) of the measurement time (TR) which has experientially been known from the load measurement in the past is preset in the ROM 7 or environment memory 13. The measurement time (TR) obtained in step S202 and the mean time (MTR) are compared. When TR>MTR, it is judged that the load of the transmission path 2 is large. When TR≦MTR, it is judged that the load is small.

In step S206, when TR>MTR, step S207 follows. The time-out time is prolonged by a predetermined time (ΔT) (TO←TO+ΔT) and the processing routine is returned to the step S203. On the contrary, when TR≦MTR, step S208 follows and the outputting process is executed. The processing routine is finished.

According to the embodiment, it is possible to control in a manner such that the load of the transmission path is measured and even when the data reception is interrupted and the apparatus reaches the time-out time, in case of a high load, the time-out time is prolonged, thereby subsequently waiting for the data reception.

According to the embodiment of the invention as mentioned above, although the measurement of the load of the transmission path has been executed in the waiting state of the printer (non-data receiving state) and a magnitude of the load has been discriminated by using such a time as it is, the invention is not limited to such a method. This point will now be described with reference to flowcharts shown in FIGS. 4 and 5.

Figure 3:
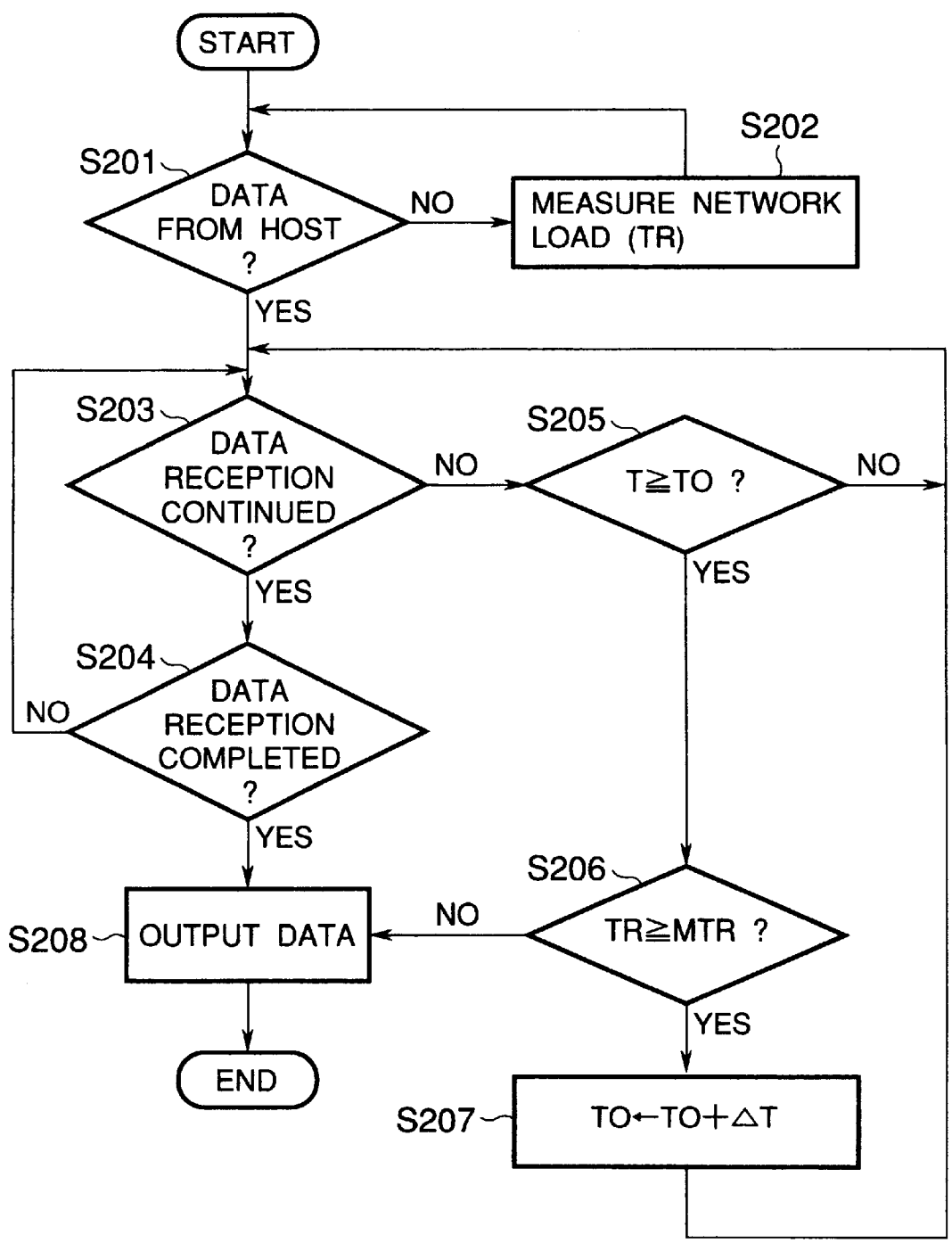
FIG. 3 is a flowchart showing a print outputting process which is executed while receiving data from the host through the LAN.
Figure 4:
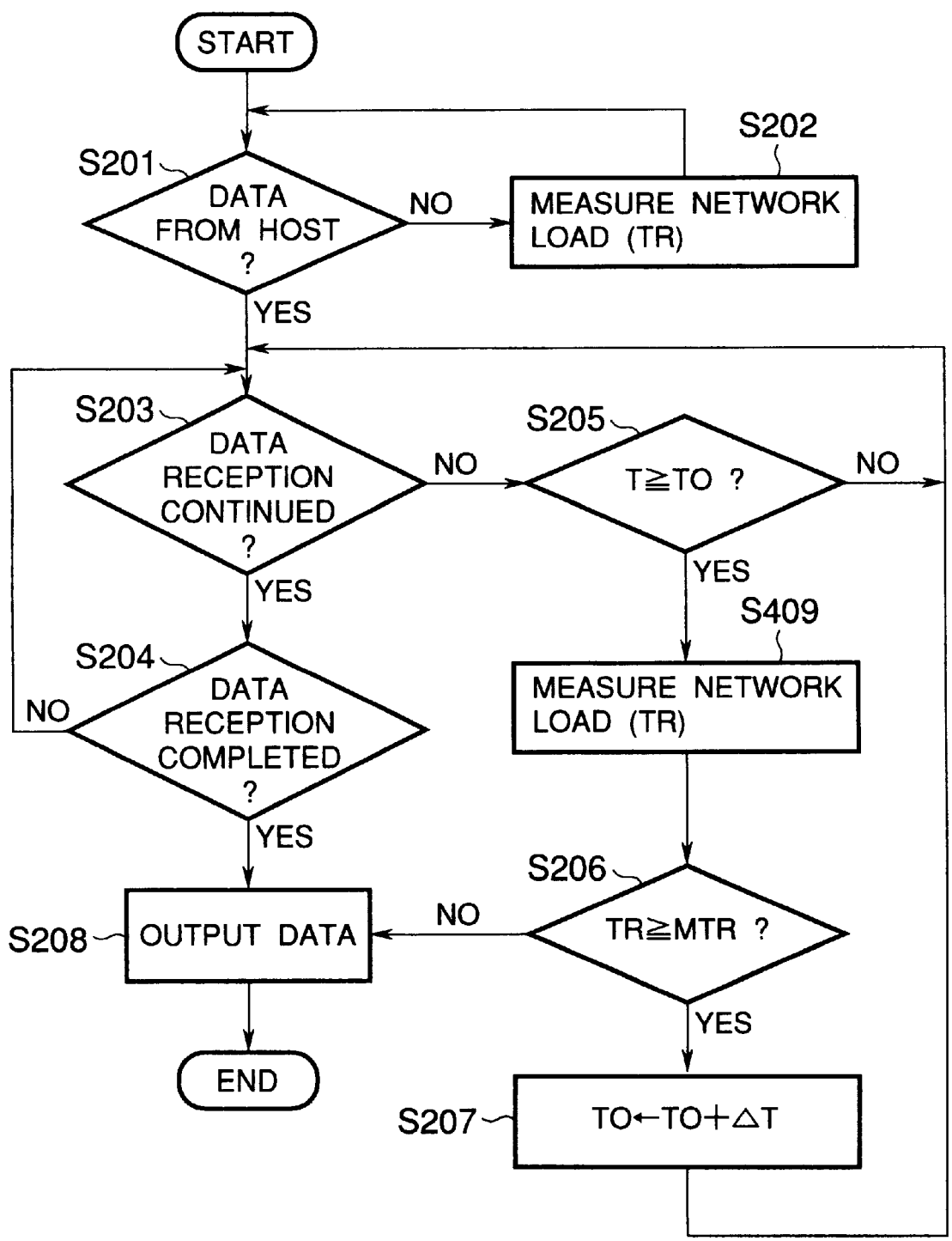
FIG. 4 is a flowchart showing a second print outputting process.

A construction of FIG. 4 is substantially the same as that of FIG. 3 except that in step S409, after the time-out time, the load of the network is again measured. By measuring the load in step S409, a latest state of the data transmission path can be known at a time point of the occurrence of the time-out of data.

Figure 5:
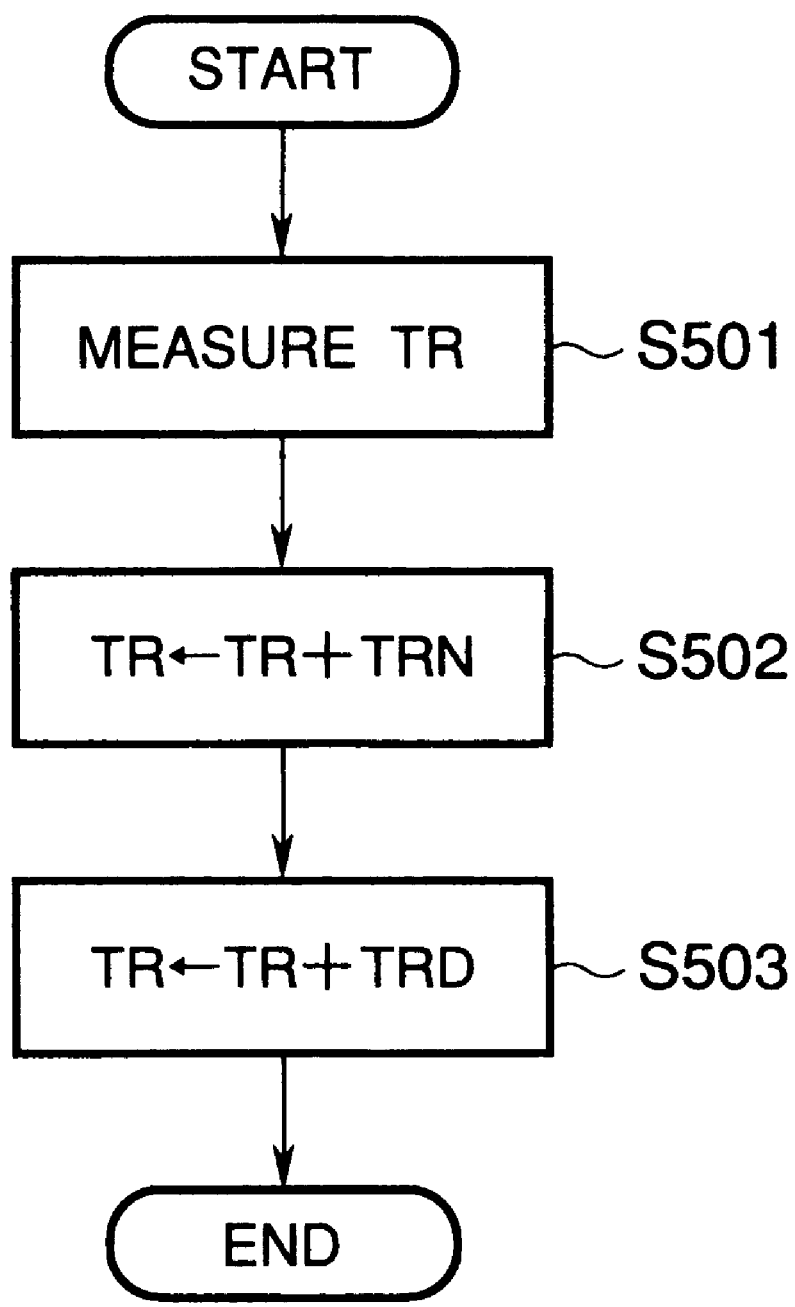
FIG. 5 is a flowchart showing a process for measuring a load of the network.

As an operation when the load of the network is measured in step S202 or S409, as shown in a flowchart in FIG. 5, the time (TR) which is required until all data is returned to the printer apparatus of the transmitting source after data was transmitted plural times from the printer apparatus to the host X is measured in step S501. After that, a value (TRN) corresponding to the type of the network to which the printer is connected is added to TR in step S502. When the network is a high-speed network, TRN is reduced (for example, 0 second). When it is a low-speed network, TRN is increased (for example, 30 seconds). In step S503, a value (TRD) corresponding to the type of the data is added. In case of text data in which a size of data to be transferred is small, TRD is reduced (for example, 0 second) and, in case of image data having a large data size, TRD is increased (for example, 30 seconds). By such a method, the value of TR which more accurately corresponds to the state of the network and the data can be obtained and a magnitude of the network load can be more properly judged.

According to the embodiment, although the judgment of the load of the transmission path has been performed on the basis of the comparison result of the measurement time (TR) and the predetermined mean time (MTR), the invention is not limited to such a method. For example, it is also possible to construct in a manner such that the value of the measurement time (TR) to be obtained from the load measurement in step S202 is divided into two or more levels and a magnitude of the load of the transmission path is discriminated by using a plurality of time-out times (for example, 10 seconds, 60 seconds, 120 seconds, . . . ) according to the respective levels.

Although the embodiment has been described with respect to the example in which the switch 302A of the push type is depressed, the switching operation is not limited to only the depression. A switch of the touch type or rotary type can be also provided for the operation panel in accordance with the type of the apparatus. Not only by operating only one switch 302A but also by simultaneously operating a plurality of switches, the operation information of those switches can be transmitted to the host 300.

Further, it will be obviously understood that it is possible to construct in a manner such that when three or more printer apparatuses of the same type are connected to the LAN and operating conditions of the apparatus which are substantially the same as those of the apparatus B described in the above-mentioned embodiment can be set by commands from the host for each printer apparatus.

It is also possible to construct in a manner such that when the data reception from the host is interrupted and it is judged that such a situation is caused by an excessive communication load of the transmission load, the extension of the time-out time as in the embodiment is not performed but the processes of the whole apparatus are temporarily stopped until the subsequent data is received and a power supply to unnecessary units of the apparatus excluding a unit for performing the process for waiting for the reception data from the host (sleep mode), thereby reducing an electric power consumption.

Further, it is also possible to control in a manner such that when the data reception from the host is interrupted, the printer apparatus identifies the type of the host serving as a data transmitting source and the time-out time is changed (extended) on the basis of a processing ability of the identified host or a communication processing ability (maximum data transfer speed) of the host I/F of the printer apparatus.

Figure 6:
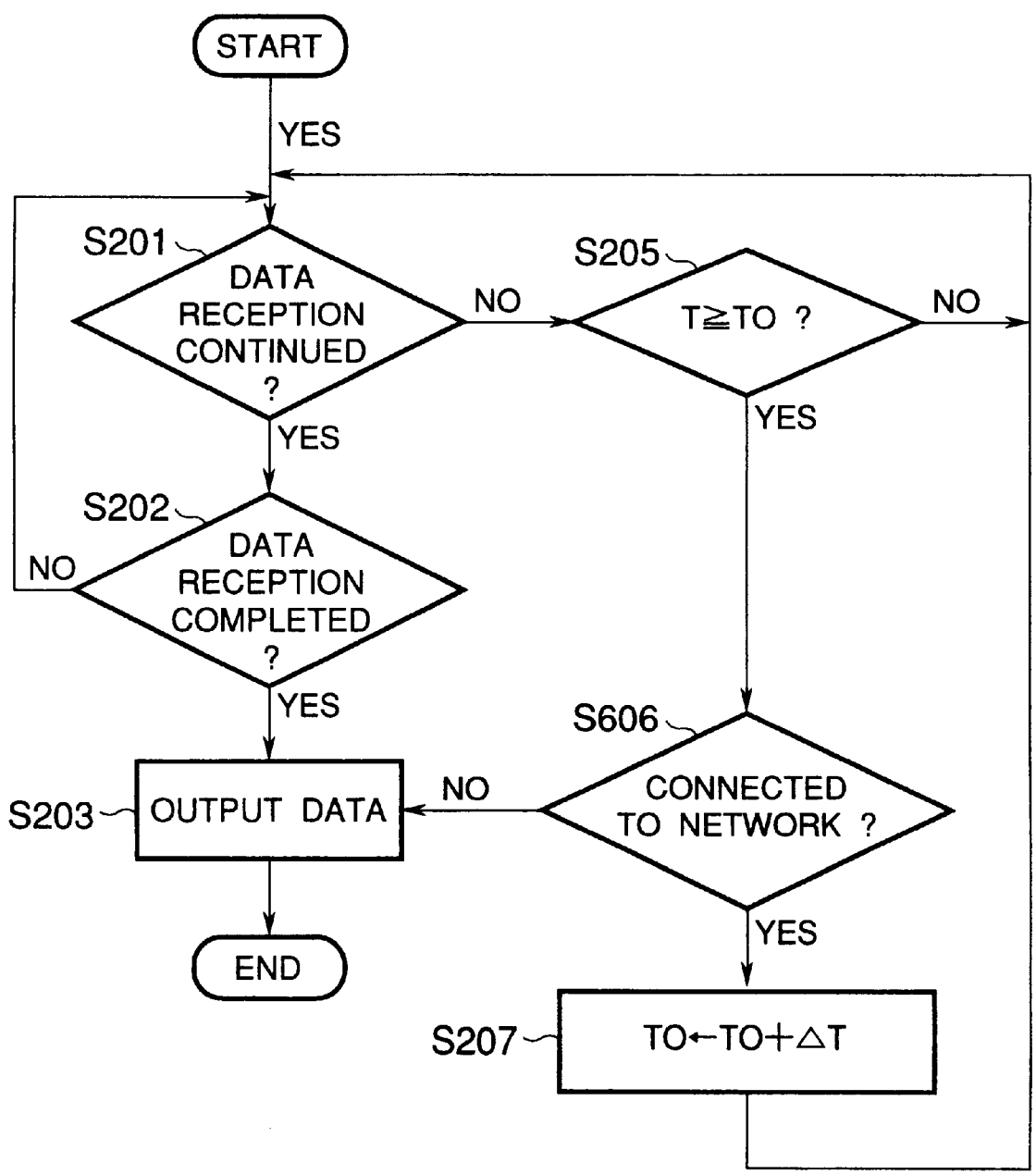
FIG. 6 is a flowchart showing a third print outputting process.

An embodiment of the invention in which the time-out time is set without measuring the load of the network will now be explained hereinbelow with reference to FIG. 6. In FIG. 6, the judgment in step S206 in FIG. 3 is replaced to step S606 and a check is made to see if a network corresponding board has merely been attached on the printer apparatus. If YES, the time-out time is extended (S207). If NO, the outputting process (S203) is executed by the ordinary time-out time. The judgment in step S606 is replaced to a judgment about whether the port (for example, Ethernet) of the interface for the network on the printer apparatus is valid (data can be received) and the port which received the data is the port for the network interface. It is also possible to control in a manner such that when the data is received from the network, it is judged that the printer is connected to the network, the time-out time is changed (extended) (S207), and when the data is received from the host without intervening the network, the outputting process (S203) is executed by the ordinary time-out time.

The invention can be applied to a system constructed by a plurality of equipment or can be also applied to an apparatus comprising one equipment. It will be obviously understood that the invention can be also applied to the case where it is accomplished by supplying a program to a system or an apparatus. In this case, a memory medium in which the program regarding the invention has been stored constructs the invention. By reading the program from the memory medium to the system or apparatus, the system or apparatus operates by a predetermined method.

According to the invention as described above, the waiting time of the data is set in dependence on the use load of the network or whether the apparatus is connected to the network or not. Therefore, there is an effect such that a proper control is performed even when the reception is delayed due to an unexpected increase in load. Thus, for example, an inconvenience such that when the waiting time exceeds a predetermined time, the receiving process is automatically forcedly finished is prevented.

According to another invention, in the system to which a plurality of printer apparatuses of the same construction are connected, there is an effect such that by setting the operating conditions into one apparatus, the same operating conditions as those of such an apparatus can be set to the other apparatuses through the network and host. The environment setting of the system can be consequently easily and certainly executed.

What is claimed is:

1. A printer system comprising a plurality of printer apparatuses and a host computer for transmitting print data to the plurality of printer apparatuses, said host computer being connected to said plurality of printer apparatuses through a network,
   wherein said host computer comprises:
      a receiver adapted for receiving operating conditions set in a first printer apparatus of said plurality of printer apparatuses from the first printer apparatus; and
      a transmitter adapted for transmitting the operating conditions received by the receiver to said plurality of printer apparatuses excluding the first printer apparatus, and
   wherein each of said plurality of printer apparatuses comprises:
      a discrimination circuit adapted for, if a data reception process of data from said host computer has been suspended for a time at least as long as a time-out time, discriminating whether a load on the network is heavy, and
      a processing circuit adapted for extending the time-out time and continuing the data reception process if the discrimination circuit discriminates that the load is heavy, and for suspending the data reception process if the discrimination circuit discriminates that the load is not heavy.

2. A printer connected to a host computer via a network, said printer comprising:
   a discrimination circuit adapted for, if a data reception process of data from the host computer has been suspended for a time at least as long as a time-out time, discriminating whether a load on the network is heavy; and
   a processing circuit adapted for extending the time-out time and continuing the data reception process if said discrimination circuit discriminates that the load is heavy, and for suspending the data reception process if said discrimination circuit discriminates that the load is not heavy.

3. A printer according to claim 2, wherein the load on the network is determined based on a time starting when first predetermined data is sent to the host computer and ending when second predetermined data is received from the host computer.

4. A printer according to claim 2, further comprising a first measurement circuit adapted for measuring the load on the network prior to the data reception process of data from the host computer, wherein said discrimination circuit discriminates whether the load is heavy based on a measurement by said first measurement circuit.

5. A printer according to claim 2, further comprising a second measurement circuit adapted for measuring the load on the network after the data reception process has been suspended for a time at least as long as the time-out time, wherein said discrimination circuit discriminates whether the load is heavy based on a measurement by said second measurement means.

6. A printer according to claim 2, further comprising a printing circuit adapted to print data based on the print data received from the host computer.

7. A printer comprising:
- a discriminating circuit adapted for discriminating whether said printer is connected to a host computer via a network or connected directly to the host computer;
- a setting circuit adapted for setting a first waiting time if said discriminating circuit discriminates that said printer is connected directly to the host computers and setting a second waiting time longer than the first waiting time if said discriminating circuit discriminates that said printer is connected to the host computer via the network; and
- a processing circuit adapted for performing a data reception process of data from the host computer,
- wherein, if said discriminating circuit discriminates that said printer is connected directly to the host computer, said processing circuit discontinues the data reception process if the data reception process has been suspended for a time at least as long as the first waiting time, and continues the data reception process if the data reception process has been suspended for a time shorter than the first waiting time, and
- wherein, if said discriminating circuit discriminates that said printer is connected to the host computer via the network, said processing circuit discontinues the data reception process if the data reception process has been suspended for a time at least as long as the second waiting time, and continues the data reception process if the data reception process has been suspended for a time shorter than the second waiting time.

8. A printer according to claim 7, wherein said discriminating circuit discriminates that said printer is connected to the host computer via the network if a network board is mounted on said printer, and discriminates that said printer is connected directly to the host computer if no network board is mounted on said printer.

9. A printer according to claim 7, wherein said discriminating circuit discriminates that said printer is connected to the host computer via the network if data is received from a network interfaces and discriminates that said printer is connected directly to the host computer if data is received from an element other than a network interface.

10. A printer according to claim 7, further comprising a printing circuit adapted for printing data based on the data received from the host computer.

11. A data reception apparatus connected to a data transmission apparatus via a network, said data reception apparatus comprising:
- a discrimination circuit adapted for, if a data reception process of data from a host computer has been suspended for a time at least as long as a time-out time, discriminating whether a load on the network is heavy; and
- a processing circuit adapted for extending the time-out time and continuing the data reception process if said discrimination circuit discriminates that the load is heavy, and for suspending the data reception process if said discrimination circuit discriminates that the load is not heavy.

12. A data reception apparatus according to claim 11, further comprising a printing circuit adapted for printing data based on the data received from the data transmission apparatus.

13. A data reception apparatus according to claim 11, wherein the load on the network is determined based on a time starting when first predetermined data is sent to the data transmission apparatus and ending when second predetermined data is received from the data transmission apparatus.

14. A data reception apparatus according to claim 11, further comprising a first measurement circuit adapted for measuring the load on the network prior to the data reception from the data transmission apparatus, wherein said discrimination circuit discriminates whether the load is heavy based on a measurement by said first measurement circuit.

15. A data reception apparatus according to claim 11, further comprising a second measurement circuit adapted for measuring the load on the network after the data reception process has been suspended for a time at least as long as the time-out time, wherein said discrimination circuit discriminates whether the load is heavy based on a measurement by said second measurement means.

16. A data reception apparatus according to claim 11, wherein said setting circuit sets the waiting time to be longer as the load on the network increases.

17. A data reception apparatus comprising:
- a discriminating circuit adapted for discriminating whether said data reception apparatus is connected to a data transmission apparatus via a network or connected directly to the data transmission apparatus;
- a setting circuit adapted for setting a first waiting time if said discriminating circuit discriminates that said data reception apparatus is connected directly to the data transmission apparatus, and setting a second waiting time longer than the first waiting time if said discriminating circuit discriminates that said data reception apparatus is connected to the data transmission apparatus via the network; and
- a processing circuit adapted for performing a data reception process of data received from the data transmission apparatus,
- wherein, if said discriminating circuit discriminates that said data reception apparatus is connected directly to the data transmission apparatus, said processing circuit discontinues the data reception process if the data reception process has been suspended for a time at least as long as the first waiting time, and continues the data reception process if the data reception process has been suspended for a time shorter than the first waiting time, and
- wherein, if said discriminating circuit discriminates that said data reception apparatus is connected to the data transmission apparatus via the network, said processing circuit discontinues the data reception process if the data reception process has been suspended for a time at least as long as the second waiting time, and continues the data reception process if the data reception process has been suspended for a time shorter than the second waiting time.

18. A data reception apparatus according to claim 17, wherein said discriminating circuit discriminates that said data reception apparatus is connected to the data transmission apparatus via the network if a network board is mounted on said data reception apparatus, and discriminates that said data reception apparatus is connected directly to the data transmission apparatus if no network board is mounted on said data reception apparatus.

19. A data reception apparatus according to claim 17, wherein said discriminating circuit discriminates that said data reception apparatus is connected to the data transmission apparatus via the network if data is received from a network interfaces and discriminates that said data reception apparatus is connected directly to the data transmission apparatus if data is received from an element other than a network interface.

20. A data reception apparatus according to claim 17, further comprising a printing circuit adapted for printing data based on the data received from the data transmission apparatus.

21. A method operative in a printer connected to a host computer via a network, said method comprising the steps of:

if a data reception process of data from the host computer has been suspended for a time at least as long as a time-out time, discriminating whether a load on the network is heavy; and extending the time-out time and continuing the data reception process if said discriminating step discriminates that the load is heavy, and suspending the data reception process if said discriminating step discriminates that the load is not heavy.

22. A method according to claim 21, further comprising the step of printing data based on the data received from the host computer.

23. A method according to claim 21, wherein the load on the network is determined based on a time starting when first predetermined data is sent to the host computer and ending when second predetermined data is received from the host computer.

24. A method according to claim 21, further comprising the step of measuring the load on the network prior to receiving the data from the host computer, wherein said discriminating step discriminates whether the load is heavy based on a measurement in said measuring step.

25. A method according to claim 21, further comprising the step of measuring the load on the network after the data reception process has been suspended for a time at least as the time-out time, wherein said discriminating step discriminates whether the load is heavy based on a measurement in said measuring step.

26. A method operative in a printer, said method comprising the steps of:

discriminating whether the printer is connected to a host computer via a network or connected directly to the host computer;

setting a first waiting time if said discriminating step discriminates that the printer is connected directly to the host computers and setting a second waiting time longer than the first waiting time if said discriminating step discriminates that the printer is connected to the host computer via the network; and performing a data reception process of data from the host computer, wherein, if said discriminating step discriminates that the printer is connected directly to the host computer, said processing step discontinues the data reception process if the data reception process has been suspended for a time at least as long as the first waiting time, and continues the data reception process if the data reception process has been suspended for a time shorter than the first waiting time, and wherein, if said discriminating step discriminates that the printer is connected to the host computer via the network, said processing step discontinues the data reception process if the data reception process has been suspended for a time at least as long as the second waiting time, and continues the data reception process if the data reception process has been suspended for a time shorter than the second waiting time.

27. A method according to claim 26, wherein said discriminating step discriminates that the printer is connected to the host computer via the network if a network board is mounted on the printer, and discriminates that the printer is connected directly to the host computer if no network board is mounted on the printer.

28. A method according to claim 26, wherein said discriminating step discriminates that the printer is connected to the host computer via the network if data is received from a network interfaces and discriminates that the printer is connected directly to the host computer if data is received from an element other than a network interface.

29. A method according to claim 26, further comprising the step of printing data based on the data received from the host computer.

30. A method operative in a data reception apparatus connected to a data transmission apparatus via a network, said method comprising the steps of:

if a data reception process of data from a host computer has been suspended for a time at least as long as a time-out time, discriminating whether a load on the network is heavy; and extending the time-out time and continuing the data reception process if said discriminating step discriminates that the load is heavy, and suspending the data reception process if said discriminating step discriminates that the load is not heavy.

31. A method according to claim 30, further comprising the step of printing data based on the data received from the data transmission apparatus.

32. A method according to claim 30, wherein the load on the network is determined based on a time starting when first predetermined data is sent to the data transmission apparatus and ending when second predetermined data is received from the data transmission apparatus.

33. A method according to claim 30, further comprising the step of measuring the load on the network prior to receiving the data from the data transmission apparatus, wherein said discriminating step discriminates whether the load is heavy based on a measurement in said measuring step.

34. A method according to claim 30, further comprising the step of measuring the load on the network after the data reception process has been suspended for a time at least as the time-out time, wherein said discriminating step discriminates whether the load is heavy based on a measurement in said measuring step.

35. A method operative in a data reception apparatus, said method comprising the steps of:

discriminating whether the data reception apparatus is connected to a data transmission apparatus via a network or connected directly to the data transmission apparatus;

setting a first waiting time if said discriminating step discriminates that the data reception apparatus is connected directly to the data transmission apparatus, and setting a second waiting time longer than the first waiting time if said discriminating step discriminates that the data reception apparatus is connected to the data transmission apparatus via the network; and performing a data reception process of data received from the data transmission apparatus, wherein, if said discriminating step discriminates that the data reception apparatus is connected directly to the data transmission apparatus, said processing step discontinues the data reception process if the data reception process has been suspended for a time at least as long as the first waiting time, and continues the data reception process if the data reception process has been suspended for a time shorter than the first waiting time, and wherein, if said discriminating step discriminates that the data reception apparatus is connected to the data transmission apparatus via the network, said processing step discontinues the data reception process if the data reception process has been suspended for a time at least as long as the second waiting time, and continues the data reception process if the data reception process has been suspended for a time shorter than the second waiting time.

36. A method according to claim 35, wherein said discriminating step discriminates that the data reception apparatus is connected to the data transmission apparatus via the network if a network board is mounted on the data reception apparatus, and discriminates that the data reception apparatus is connected directly to the data transmission apparatus if no network board is mounted on the data reception apparatus.

37. A method according to claim 35, wherein said discriminating step discriminates that the data reception apparatus is connected to the data transmission apparatus via the network if data is received from a network interfaces and discriminates that the data reception apparatus is connected directly to the data transmission apparatus if data is received from an element other than a network interface.

38. A method according to claim 35, further comprising the step of printing data based on the data received from the data transmission apparatus.

39. A computer readable storage medium storing a program for executing a method operative in a printer connected to a host computer via a network, the program comprising:

code for, if a data reception process of data from the host computer has been suspended for a time at least as long as a time-out time, discriminating whether a load on the network is heavy; and code for extending the time-out time and continuing the data reception process if said code for discriminating discriminates that the load is heavy, and for suspending the data reception process if said code for discriminating discriminates that the load is not heavy.

40. A medium according to claim 39, the program further comprising code for printing data based on the data received from the host computer.

41. A medium according to claim 39, wherein the load on the network is determined based on a time starting when first predetermined data is sent to the host computer and ending when second predetermined data is received from the host computer.

42. A medium according to claim 39, the program further comprising code for measuring the load on the network prior to receiving the data from the host computer, wherein said code for discriminating discriminates whether the load is heavy based on a measurement by said code for measuring.

43. A medium according to claim 39, the program further comprising code for measuring the load on the network after the data reception process has been suspended for a time at least as long as the time-out time, wherein said code for discriminating discriminates whether the load is heavy based on a measurement by said code for measuring.

44. A computer readable storage medium storing a program for executing a method operative in a printer, the program comprising:

code for discriminating whether the printer is connected to a host computer via a network or connected directly to the host computer;

code for setting a first waiting time if said code for discriminating discriminates that the printer is connected directly to the host computers and setting a second waiting time longer than the first waiting time if said code for discriminating discriminates that the printer is connected to the host computer via the network; and code for performing a data reception process of data from the host computer, wherein, if said code for discriminating discriminates that the printer is connected directly to the host computer, said code for performing a data reception process discontinues the data reception process if the data reception process has been suspended for a time at least as long as the first waiting time, and continues the data reception process if the data reception process has been suspended for a time shorter than the first waiting time, and wherein, if said code for discriminating discriminates that the printer is connected to the host computer via the network, said code for performing a data reception process discontinues the data reception process if the data reception process has been suspended for a time at least as long as the second waiting time, and continues the data reception process if the data reception process has been suspended for a time shorter than the second waiting time.

45. A medium according to claim 44, wherein said code for discriminating discriminates that the printer is connected to the host computer via the network if a network board is mounted on the printers and discriminates that the printer is connected directly to the host computer if no network board is mounted on the printer.

46. A medium according to claim 44, wherein said code for discriminating discriminates that the printer is connected to the host computer via the network if data is received from a network interfaces and discriminates that the printer is connected directly to the host computer if data is received from an element other than a network interface.

47. A medium according to claim 44, the program further comprising code for printing data based on the data received from the host computer.

48. A computer readable storage medium storing a program for executing a method operative in a data reception apparatus connected to a data transmission apparatus via a network, the program comprising:

code for, if a data reception process of data from a host computer has been suspended for a time at least as lone as a time-out time, discriminating whether a load on the network is heavy; and code for extending the time-out time and continuing the data reception process of if said code for discriminating discriminates that the load is heavy, and for suspending the data reception process if said code for discriminating discriminates that the load is not heavy.

49. A medium according to claim 48, the program further comprising code for printing data based on the data received from the data transmission apparatus.

50. A medium according to claim 48, wherein the load on the network is determined based on a time starting when first predetermined data is sent to the data transmission apparatus and ending when second predetermined data is received from the data transmission apparatus.

51. A medium according to claim 48, the program further comprising code for measuring the load on the network prior to receiving the data from the data transmission apparatus, wherein said code for discriminating discriminates whether the load is heavy based on a measurement by said code for measuring.

52. A medium according to claim 48, the program further comprising code for measuring the load on the network after the data reception process has been suspended for a time at least as long as the time-out time, wherein said code for discriminating discriminates whether the load is heavy based on a measurement by said code for measuring.

53. A computer readable storage medium storing a program for executing a method operative in a data reception apparatus, the program comprising:
   code for discriminating whether the data reception apparatus is connected to a data transmission apparatus via a network or connected directly to the data transmission apparatus;
   code for setting a first waiting time if said code for discriminating discriminates that the data reception apparatus is connected directly to the data transmission apparatus, and setting a second waiting time longer than the first waiting time if said code for discriminating discriminates that the data reception apparatus is connected to the data transmission apparatus via the network; and
   code for performing a data reception process of data received from the data transmission apparatus,
   wherein, if said code for discriminating discriminates that the data reception apparatus is connected directly to the data transmission apparatus, said code for performing a data reception process discontinues the data reception process if the data reception process has been suspended for a time at least as long as the first waiting time, and continues the data reception process if the data reception process has been suspended for a time shorter than the first waiting time, and
   wherein, if said code for discriminating discriminates that the data reception apparatus is connected to the data transmission apparatus via the network, said code for performing a data reception process discontinues the data reception process if the data reception process has been suspended for a time at least as long as the second waiting time, and continues the data reception process if the data reception process has been suspended for a time shorter than the second waiting time.

54. A medium according to claim 53, wherein said code for discriminating discriminates that the data reception apparatus is connected to the data transmission apparatus via the network if a network board is mounted on the data reception apparatus, and discriminates that the data reception apparatus is connected directly to the data transmission apparatus if no network board is mounted on the data reception apparatus.

55. A medium according to claim 53, wherein said code for discriminating discriminates that the data reception apparatus is connected to the data transmission apparatus via the network if data is received from a network interface, and discriminates that the data reception apparatus is connected directly to the data transmission apparatus if data is received from an element other than a network interface.

56. A medium according to claim 53, the program further comprising code for printing data based on the data received from the data transmission apparatus.

57. A computer program product for a implementing a method operative in a printer connected to a host computer via a network, said program product comprising:
   code for, if a data reception process of data from the host computer has been suspended for a time at least as long as a time-out time, discriminating whether a load on the network is heavy; and
   code for extending the time-out time and continuing the data reception process if said code for discriminating discriminates that the load is heavy, and for suspending the data reception process if said code for discriminating discriminates that the load is not heavy.

58. A program product according to claim 57, further comprising code for printing data based on the data received from the host computer.

59. A program product according to claim 57, wherein the load on the network is determined based on a time starting when first predetermined data is sent to the host computer and ending when second predetermined data is received from the host computer.

60. A program product according to claim 57, further comprising code for measuring the load on the network prior to receiving the data from the host computer, wherein said code for discriminating discriminates whether the load is heavy based on a measurement by said code for measuring.

61. A program product according to claim 57, further comprising code for measuring the load on the network after the data reception process has been suspended for a time at least as long as the time-out time, wherein said code for discriminating discriminates whether the load is heavy based on a measurement by said code for measuring.

62. A program product for implementing a method operative in a printer, said program product comprising:
   code for discriminating whether the printer is connected to a host computer via a network or connected directly to the host computer;
   code for setting a first waiting time if said code for discriminating discriminates that the printer is connected directly to the host computer, and setting a second waiting time longer than the first waiting time if said code for discriminating discriminates that the printer is connected to the host computer via the network; and
   code for performing a data reception process of data from the host computer,
   wherein, if said code for discriminating discriminates that the printer is connected directly to the host computer, said code for performing a data reception process discontinues the data reception process if the data reception process has been suspended for a time at least as long as the first waiting time, and continues the data reception process if the data reception process has been suspended for a time shorter than the first waiting time, and
   wherein, if said code for discriminating discriminates that the printer is connected to the host computer via the network, said code for performing a data reception process discontinues the data reception process if the data reception process has been suspended for a time at least as long as the second waiting time, and continues the data reception process if the data reception process has been suspended for a time shorter than the second waiting time.

63. A program product according to claim 62, wherein said code for discriminating discriminates that the printer is connected to the host computer via the network if a network board is mounted on the printer, and discriminates that the printer is connected directly to the host computer if no network board is mounted on the printer.

64. A program product according to claim 62, wherein said code for discriminating discriminates that the printer is connected to the host computer via the network if data is received from a network interface, and discriminates that the printer is connected directly to the host computer if data is received from an element other than a network interface.

65. A program product according to claim 62, further comprising code for printing data based on the data received from the host computer.

66. A program product for implementing a method operative in a data reception apparatus connected to a data transmission apparatus via a network, said program product comprising:
   code for, if a data reception process of data from a host computer has been suspended for a time at least as long as a time-out time, discriminating whether a load on the network is heavy; and
   code for extending the time-out time and continuing the data reception process of if said code for discriminating discriminates that the load is heavy, and for suspending the data reception process if said code for discriminating discriminates that the load is not heavy.

67. A program product according to claim 66, further comprising code for printing data based on the data received from the data transmission apparatus.

68. A program product according to claim 66, wherein the load on the network is determined based on a time starting when first predetermined data is sent to the data transmission apparatus and ending when second predetermined data is received from the data transmission apparatus.

69. A program product according to claim 66, further comprising code for measuring the load on the network prior to receiving the data from the data transmission apparatus, wherein said code for discriminating discriminates whether the load is heavy based on a measurement by said code for measuring.

70. A program product according to claim 66, further comprising code for measuring the load on the network after the data reception process has been suspended for a time at least as long as the time-out time, wherein said code for discriminating discriminates whether the load is heavy based on a measurement by said code for measuring.

71. A program product for implementing a method operative in a data reception apparatus, said program product comprising:
   code for discriminating whether the data reception apparatus is connected to a data transmission apparatus via a network or connected directly to the data transmission apparatus;
   code for setting a first waiting time if said code for discriminating discriminates that the data reception apparatus is connected directly to the data transmission apparatus, and setting a second waiting time longer than the first waiting time if said code for discriminating discriminates that the data reception apparatus is connected to the data transmission apparatus via the network; and
   code for performing a data reception process of data received from the data transmission apparatus,
   wherein, if said code for discriminating discriminates that the data reception apparatus is connected directly to the data transmission apparatus, said code for performing a data reception process discontinues the data reception process if the data reception process has been suspended for a time at least as long as the first waiting time, and continues the data reception process if the data reception process has been suspended for a time shorter than the first waiting time, and
   wherein, if said code for discriminating discriminates that the data reception apparatus is connected to the data transmission apparatus via the network, said code for performing a data reception process discontinues the data reception process if the data reception process has been suspended for a time at least as long as the second waiting time, and continues the data reception process if the data reception process has been suspended for a time shorter than the second waiting time.

72. A program product according to claim 71, wherein said code for discriminating discriminates that the data reception apparatus is connected to the data transmission apparatus via the network if a network board is mounted on the data reception apparatus, and discriminates that the data reception apparatus is connected directly to the data transmission apparatus if no network board is mounted on the data reception apparatus.

73. A program product according to claim 71, wherein said code for discriminating discriminates that the data reception apparatus is connected to the data transmission apparatus via the network if data is received from a network interface, and discriminates that the data reception apparatus is connected directly to the data transmission apparatus if data is received from an element other than a network interface.

74. A program product according to claim 71, further comprising code for printing data based on the data received from the data transmission apparatus.

* * * * *

UNITED STATES PATENT AND TRADEMARK OFFICE
CERTIFICATE OF CORRECTION

PATENT NO. : 6,184,995 B1
DATED : February 6, 2001
INVENTOR(S) : Hideki Sakai et al.

It is certified that error appears in the above-identified patent and that said Letters Patent is hereby corrected as shown below:

Title page,
Item [30] FOREIGN APPLICATION PRIORITY DOCUMENT,
Insert: -- [30] FOREIGN APPLICATION PRIORITY DATA
        July 11, 1995 (JP) .... 7-174832
        June 17, 1996 (JP) .... 8-155504 --.

Column 1,
Line 24, "uses" should read -- use --.
Line 48, "the own apparatus" should read -- the apparatus itself --.

Column 4,
Line 1, "above mentioned" should read -- above-mentioned --.

Column 7,
Lines 39 and 44, "to" should read -- by --.

Column 8,
Line 7, "invention," should read -- embodiment, --.

Column 9,
Line 16, "computers" should read -- computer, --.
Line 47, "interfaces" should read -- interface, --.

Column 11,
Line 5, "interfaces" should read -- interface, --.
Line 40, "as" should read -- as long as --.
Line 51, "computers" should read -- computer, --.

Column 12,
Line 15, "interfaces" should read -- interface, --.
Line 48, "as" should read -- as long as --.

Column 13,
Line 28, "interfaces" should read -- interface, --.

UNITED STATES PATENT AND TRADEMARK OFFICE
CERTIFICATE OF CORRECTION

PATENT NO. : 6,184,995 B1
DATED : February 6, 2001
INVENTOR(S) : Hideki Sakai et al.

It is certified that error appears in the above-identified patent and that said Letters Patent is hereby corrected as shown below:

<u>Column 14,</u>
Line 9, "computers" should read -- computer, --.
Line 37, "printers" should read -- printer, --.
Line 43, "interfaces" should read -- interface, --.
Line 54, "lone" should read -- long --.
Line 59, "of" should be deleted.

Signed and Sealed this

Thirteenth Day of November, 2001

*Attest:*

*Attesting Officer*

NICHOLAS P. GODICI
*Acting Director of the United States Patent and Trademark Office*